(12) United States Patent
Robbins et al.

(10) Patent No.: US 10,108,144 B2
(45) Date of Patent: Oct. 23, 2018

(54) HOLOGRAPHIC WIDE FIELD OF VIEW DISPLAY

(71) Applicant: Microsoft Technology Licensing, LLC, Redmond, WA (US)

(72) Inventors: Steven John Robbins, Redmond, WA (US); Andrew Maimone, Duvall, WA (US); Andreas Georgiou, Cambridge (GB); Joel Steven Kollin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 125 days.

(21) Appl. No.: 15/268,269

(22) Filed: Sep. 16, 2016

(65) Prior Publication Data
US 2018/0081322 A1 Mar. 22, 2018

(51) Int. Cl.
*G03H 1/04* (2006.01)
*G02B 27/00* (2006.01)
(Continued)

(52) U.S. Cl.
CPC ....... *G03H 1/0486* (2013.01); *G02B 27/0093* (2013.01); *G02B 27/0172* (2013.01);
(Continued)

(58) Field of Classification Search
CPC ............ G02B 27/0093; G02B 27/0172; G02B 2027/0123; G02B 2027/014;
(Continued)

(56) References Cited

U.S. PATENT DOCUMENTS 4,932,731 A * 6/1990 Suzuki ............... G02B 27/0103
359/13
5,907,416 A 5/1999 Hegg et al.
(Continued)

FOREIGN PATENT DOCUMENTS

EP 2447787 A1 5/2012
WO 2015032828 A1 3/2015

OTHER PUBLICATIONS

"International Search Report and Written Opinion Issued in PCT Application No. PCT/US2017/051040", dated Dec. 13, 2017, 11 Pages.
(Continued)

*Primary Examiner* — Huy T Nguyen
(74) *Attorney, Agent, or Firm* — Workman Nydegger

(57) ABSTRACT

A head-mounted display device comprises a rendering engine configured to generate a hologram representative of a three-dimensional object. The hologram includes depth information that causes the three-dimensional object to be rendered with a focus that is determined by the depth information. The device also includes a spatial light modulator that modulates light from a light source as indicated by the hologram. A switchable hologram comprises multiple stacked switchable gratings. Each of the stacked switchable gratings is associated with one or more resulting exit pupil locations on a viewing surface. The system also comprises an eye tracker configured to map a viewing direction of a user's eye to a viewing location on the viewing surface. A processor is configured to activate a particular switchable grating within the switchable transmission hologram that is associated with an exit pupil location that aligns with the viewing location.

20 Claims, 9 Drawing Sheets

(51) Int. Cl.
*G02B 27/01* (2006.01)
*G03H 1/00* (2006.01)
*G03H 1/12* (2006.01)
*G03H 1/22* (2006.01)
*G03H 1/26* (2006.01)
*G03H 1/02* (2006.01)

(52) U.S. Cl.
CPC ............ *G03H 1/0005* (2013.01); *G03H 1/12* (2013.01); *G03H 1/2205* (2013.01); *G03H 1/2294* (2013.01); *G03H 1/26* (2013.01); *G02B 2027/014* (2013.01); *G02B 2027/0123* (2013.01); *G02B 2027/0174* (2013.01); *G03H 2001/0088* (2013.01); *G03H 2001/0216* (2013.01); *G03H 2001/0224* (2013.01); *G03H 2001/2236* (2013.01); *G03H 2001/2242* (2013.01); *G03H 2225/23* (2013.01); *G03H 2226/05* (2013.01)

(58) Field of Classification Search
CPC ......... G02B 2027/0174; G03H 1/0005; G03H 1/12; G03H 1/0486; G03H 2001/0088; G03H 2001/0216; G03H 2001/0224
See application file for complete search history.

(56) References Cited

U.S. PATENT DOCUMENTS

| | | | |
|---|---|---|---|
| 8,218,211 B2 | 7/2012 | Kroll et al. | |
| 8,233,204 B1 | 7/2012 | Robbins et al. | |
| 8,547,615 B2 | 10/2013 | Leister | |
| 9,335,604 B2 | 5/2016 | Popovich et al. | |
| 2006/0028400 A1 | 2/2006 | Lapstun et al. | |
| 2009/0109516 A1* | 4/2009 | Wang | G03H 1/02 359/290 |
| 2010/0067077 A1* | 3/2010 | Kroll | G03H 1/2205 359/22 |
| 2010/0097439 A1* | 4/2010 | Kroll | G03H 1/0005 348/14.02 |
| 2013/0222384 A1 | 8/2013 | Futterer | |
| 2014/0104665 A1 | 4/2014 | Popovich et al. | |
| 2014/0168735 A1 | 6/2014 | Yuan et al. | |
| 2014/0176528 A1 | 6/2014 | Robbins | |
| 2014/0361990 A1* | 12/2014 | Leister | G02F 1/1323 345/156 |
| 2015/0085331 A1 | 3/2015 | Chae | |
| 2016/0041393 A1 | 2/2016 | Inagaki | |
| 2016/0110564 A1* | 4/2016 | Tsang | G06F 21/72 713/189 |

OTHER PUBLICATIONS

Yeom, et al., "Design of holographic Head Mounted Display using Holographic Optical Element", In Proceedings of 11th Conference on Lasers and Electro-Optics Pacific Rim, Aug. 24, 2015, 2 pages.

\* cited by examiner

HOLOGRAPHIC WIDE FIELD OF VIEW DISPLAY

BACKGROUND

Mixed-reality computer systems have recently received significant interest for their ability to create immersive experiences for users. "Mixed-reality" typically refers to augmented reality where virtual objects are visually placed within the real-world. In contrast, "virtual reality" typically refers to immersive virtual experiences where a user's view of the real-world is completely blocked and only virtual objects are presented. However, for the sake of clarity and simplicity, as used herein, mixed reality, virtual reality, and/or augmented reality are used interchangeably and do not limit the invention to a particular system. Mixed-reality systems include virtual reality, augmented reality, and other systems that incorporate virtual elements into a real-world environment.

Conventional mixed-reality systems operate by providing to each of a user's eyes a slightly different perspective of a virtual scene or object. The difference in the perspective provides the user with a three-dimensional view of the scene or object. In particular, the difference in the perspective provides a user with a perception of depth regarding the virtual scene or object.

Continued advances in hardware capabilities and rendering technologies has greatly increased the realism of virtual objects and scenes displayed to a user within a mixed-reality environment. For example, in augmented-reality environments, virtual objects can be placed within the real world in such a way as to give the impression that the virtual object is part of the real world. As a user moves around within the real world, the augmented-reality environment automatically updates so that the user is provided with the proper perspective and view of the virtual object.

Adjusting a user's perspective of a virtual object or scene is associated with many difficulties that extend beyond simply updating the user's perspective of the virtual object. For example, depending upon lighting with the real-world, the virtual object may be associated with different shading and specular effects from different perspectives. Similarly, depending upon the user's distance from the virtual object, the user's focal point and depth of focus may also change. Accounting for various visual aspects of a virtual object based upon the user's view of the object would significantly increase the realistic quality of mixed-reality systems. Accordingly, there is a need in the field for better visual depiction of virtual objects.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein comprise a head-mounted display device. The head-mounted display device comprises a rendering engine configured to generate a hologram representative of a three-dimensional object. The hologram includes depth information that causes the three-dimensional object to be rendered with a focus that is determined by the depth information. A spatial light modulator modulates light from a light source as indicated by the hologram.

Disclosed embodiments also include a switchable transmission hologram comprising multiple stacked switchable gratings. Each of the stacked switchable gratings is associated with a particular emission pathway of the modulated image light which is received from the spatial light modulator, one or more resulting exit pupil locations on a viewing surface, and a first prescription that is configured to remove aberrations from the modulated image light. An eye tracker maps a viewing direction of a user's eye to a viewing location on the viewing surface. A processor is configured to activate a particular switchable grating within the switchable transmission hologram that is associated with an exit pupil location that aligns with the viewing location.

Disclosed embodiments also include a method for rendering an image within a computer system. The computer system generates a first hologram representative of a three-dimensional object. The first hologram includes depth information that causes the three-dimensional object to be rendered with a focus that is determined by the depth information. The system also modulates light with a spatial light modulator as indicated by the first hologram. Additionally, the system tracks, with an eye tracker, a viewing direction of a user's eye to a first viewing location on a viewing surface. The system then activates a first switchable grating within a switchable hologram that is associated with an exit pupil location that aligns with the first viewing location.

Additionally, disclosed embodiments include a computer display system for generating three-dimensional viewing. A liquid crystal on silicon display modulates the light as indicated by a phase map. A multiplexed switchable Bragg grating comprises multiple switchable Bragg gratings. Each of the switchable Bragg gratings is associated with a unique emission pathway of the modulated image light received from the spatial light modulator. Additionally, each of the switchable Bragg gratings is associated with multiple, unique resulting exit pupil locations on a viewing surface and a unique prescription that is configured to remove aberrations from the modulated image light. An eye tracker maps a viewing direction of a user's eye to a viewing location on the viewing surface. A processor then activates a particular switchable Bragg grating within the multiplexed switchable Bragg grating that is associated with an exit pupil location that aligns with the viewing location.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Some disclosed embodiments provide significant technical improvements to the field of mixed-reality computer display systems. For example, disclosed embodiments comprise a display system that projects a wide field of view into an exit pupil that can be matched to an eye location. Additionally, disclosed embodiments include a display system that adjusts a depth of focus based upon the relative location of a virtual object with respect to a user.

A mixed reality device may have no focus control, global focus control, and/or local focus control. In at least one embodiment, the holographic approach disclosed herein provides local focus control. Many conventional devices with focal control provide only global control through switchable lenses, or other similar means. As used herein, global focus control refers to the ability to apply a single focus to at least a portion of a user's field of view. In contrast, a local focus control allows individual objects and/or elements within a user's field of view to be rendered with different focuses. In general, local focus control is viewed as being the most general and useful type of focus control, but is more technically difficult to implement.

Disclosed embodiments utilize novel combinations of electronic and optical components to generate three-dimensional images. In some disclosed embodiments, the novel combinations of electronic and optical components provide technical benefits relating to the final package size of the system. For example, the novel combination of components provides for a smaller package size that is more easily integrated into a headset display than conventional larger systems.

Figure 1:
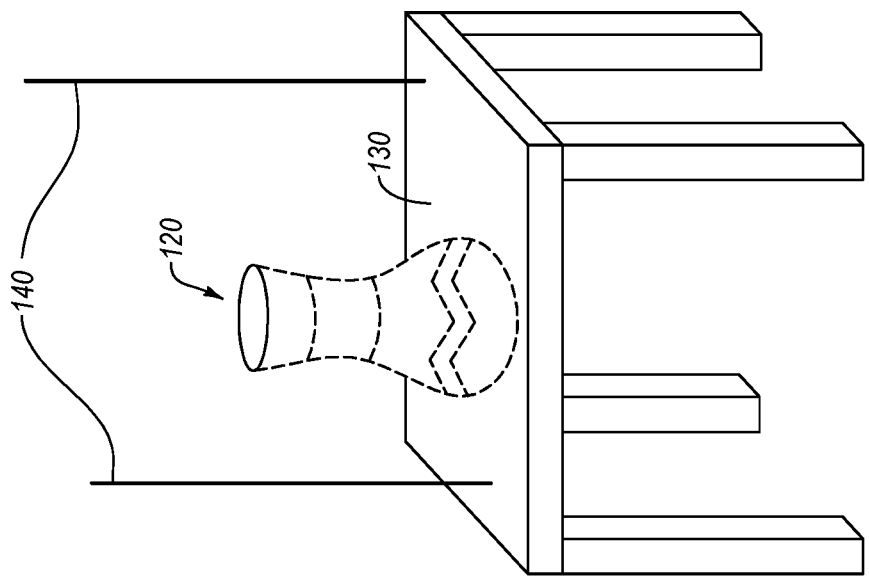
FIG. 1 illustrates a perspective view of a user viewing a virtual vase through an embodiment of a mixed-reality headset.
Figure 1:
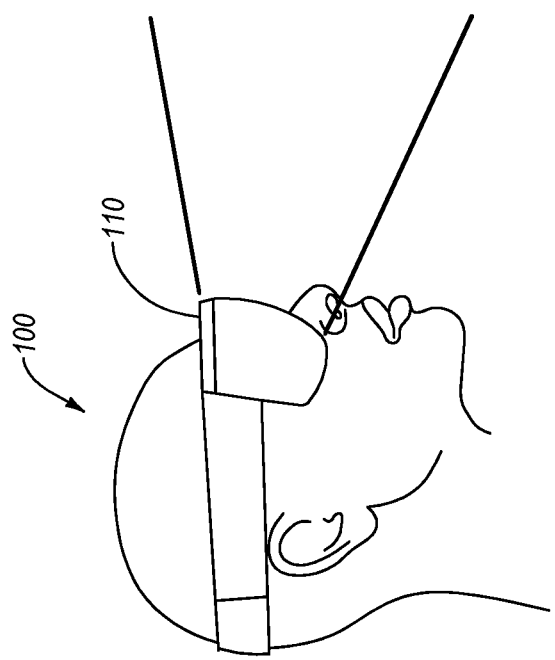

Turning now to the Figures, FIG. 1 illustrates a perspective view of a user 100 viewing a virtual vase 120 through an embodiment of a mixed-reality headset 110. The virtual vase 120 is depicted in dashed lines, while the real-world table 130 is depicted in solid lines. As such, the user 100 is provided with a three-dimensional view of a virtual vase 120 sitting upon a real-world table 130. While the depicted embodiment comprises an augmented reality device, a virtual reality device or any other headset-based device may also be equivalently used.

FIG. 1 also depicts a depth of field 140 around the vase 120. The depth of field 140 indicates the nearest and furthest point that can be considered to be in focus. Conventional mixed-reality devices may be associated with a fixed focus, such that the depth of field is static and does not change based upon the user's view. Fixed-focus systems can create a conflict between the focus and the stereo vision for given content. Disclosed embodiments teach novel systems, methods, and apparatus that provide a variable focus based upon the virtual object that is rendered.

Figure 2:
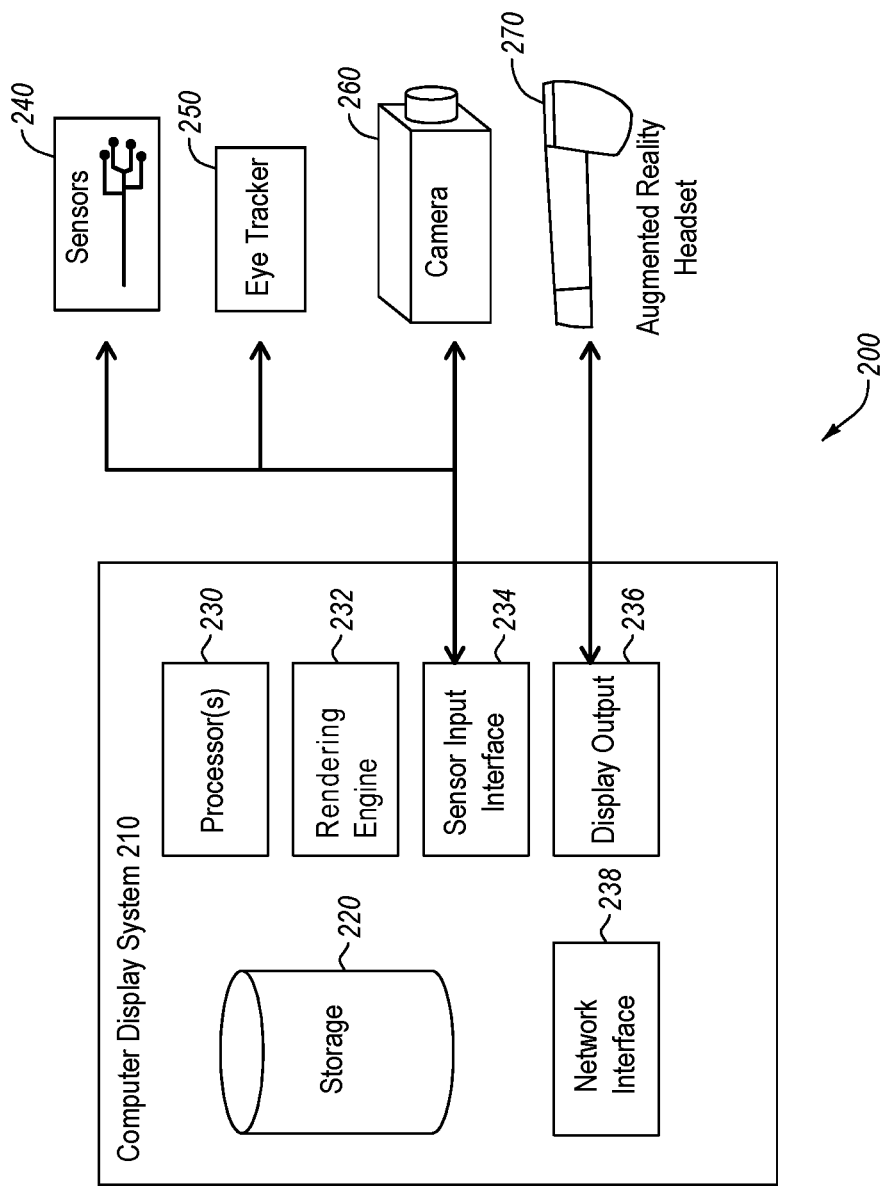
FIG. 2 illustrates a schematic view of an embodiment of a mixed-reality headset system.

FIG. 2 illustrates a schematic view of an embodiment of a mixed-reality headset system 200. The system 200 comprises various different components including a computer display system 210, sensors 240, an eye tracker 250, a camera 260, and an augmented-reality headset 270. While each of the various components are depicted as being separate, in at least one embodiment, all or a portion of the components are combined within a single device. For example, in at least one embodiment, the sensors 240, the eye tracker 250, the camera 260, and the computer display system 210 are all included within the augmented-reality headset 270. In contrast, in at least one embodiment, the augmented-headset 270 primarily functions as a display device and the above referenced components are not included within the headset 270, but are located external to the headset 270 and provide information to the headset 270 as needed.

The computer display system 210 comprises storage 220, processor(s) 230, a rendering engine 232, a sensor input interface 234, a display output interface 236, and a network interface 238. Each of the depicted elements 220, 230, 232, 234, 236, 238 of the computer display system 210 are provided only for the sake of clarity and explanation. In additional or alternative embodiments, one or more of the elements may be otherwise combined, implemented, or described. For example, in various embodiments storage 220 can comprise a software data structure, an ordered data structure stored in memory, a hardware storage device, a volatile storage device, or any combination thereof.

As used herein, the rendering engine 232 comprises software and/or hardware components used to generate image data necessary for displaying an image within the augmented-reality headset 270. For example, the rendering engine 232 may comprise a graphics processing unit (GPU) and/or a graphics application program interface (API). The rendering engine 232 outputs image data in a format configured to be readable by the display output interface 236.

In at least one embodiment, the rendering engine 232 is configured to generate a hologram representative of a three-dimensional object. The hologram includes depth information that causes the three-dimensional object to be rendered with a focus that is determined by the depth information. For example, the rendering engine 232 receives object data from storage 220. The object data may relate to the vase 120 depicted in FIG. 1. Upon receiving the object data, the rendering engine 232 generates a hologram in the form of rendering information that the display output interface 236 uses to render the vase 120. In at least one disclosed embodiment, the rendering engine 232 generates the hologram with focal control on a per-pixel basis.

In at least one embodiment, the rendering information comprises a phase map that causes a phase spatial light modulator to modulate light phase to generate a three-dimensional view of the vase 120. In at least one embodiment, a phase map comprises a two-dimensional array of phase shifts, wherein each entry within the array is associated with a pixel within the phase spatial light modulator. As such, the phase map also comprises phase modulation instructions that cause a phase spatial light modulator to modulate light phase to generate the vase at the proper focus based upon the distance of the vase from the user 100. In at least one embodiment, the depth information is provided by the rendering engine 232. For example, the rendering engine 232 is aware of the relative distance that the vase 120 should appear from the user 100. Based upon the distance and various variables relating to the depth of field 140, the rendering engine 232 properly renders the vase 120 such that it is in the correct focus. Accordingly, disclosed embodiments are capable of adjusting the focus of rendered objects more efficiently than a conventional fixed-lens system.

The display output interface 236 comprises one or more electronic and/or optical elements that are configured to communicate to a display medium within the augmented-reality headset 270. As will be discussed more fully herein, in at least one embodiment, the display output interface 236 comprises one or more of a light source, a light modulator, a switchable hologram (e.g., multiplexed switchable Bragg grating or other switchable hologram), one or more lenses, and various other display components, such as a waveguide display.

At least one embodiment also includes an eye tracker 250 configured to map a viewing direction of a user's eye to a viewing location on the viewing surface. In at least one embodiment, the eye tracker 250 is integrated within the augmented-reality headset 250. The eye tracker 250 is configured to map the gaze direction of a user to a particular location on the viewing surface. In response to receiving an indication of the viewing direction of the user's eye, a processor activates a particular switchable grating within the switchable hologram that is associated with an exit pupil location that aligns with the viewing location that matches the user's gaze.

Figure 3:
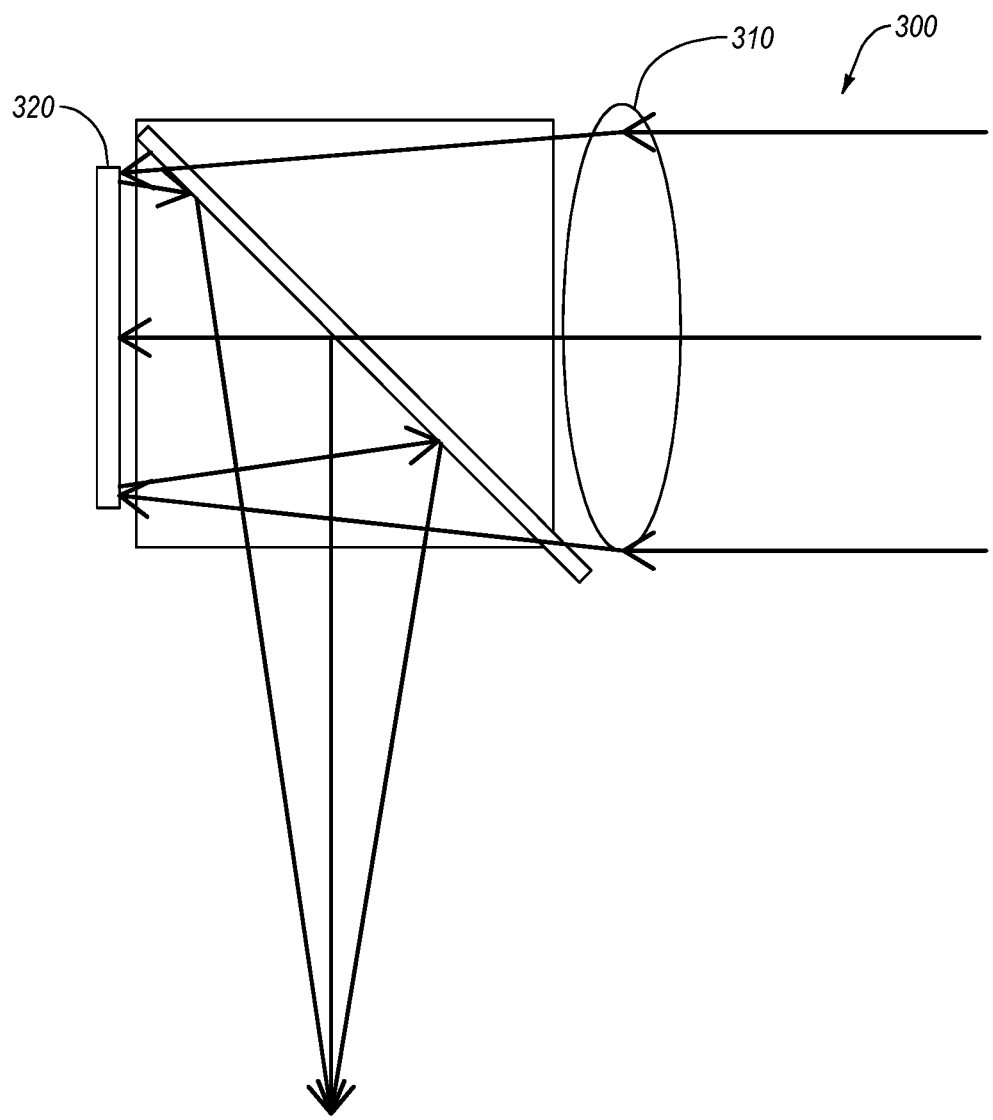
FIG. 3 illustrates a schematic view of a portion of an embodiment of a display system.

FIG. 3 illustrates a schematic view of a portion of an embodiment of a display system. An incoming laser 300 is focused by a lens 310. The field of view of the final display is generated by the cone of light coming from this lens 310 initially as a spherical wave front (focused to a single point). A phase device 320 is configured to modulate the spherical wave front such that an exit pupil is generated at a diffractive optical element together with all the display pixels focused at infinity. In some instances, the generated exit pupil comprises a size within a range of between about 0.5 mm and about 10 mm, more preferably within a range of between about 0.5 mm and 5 mm and even more preferably within a range of between about 1 mm and about 2 mm. However, the exit pupil may also be less than 0.5 mm or greater than 10 mm to accommodate different needs and preferences within the scope of the disclosed embodiments.

Figure 4:
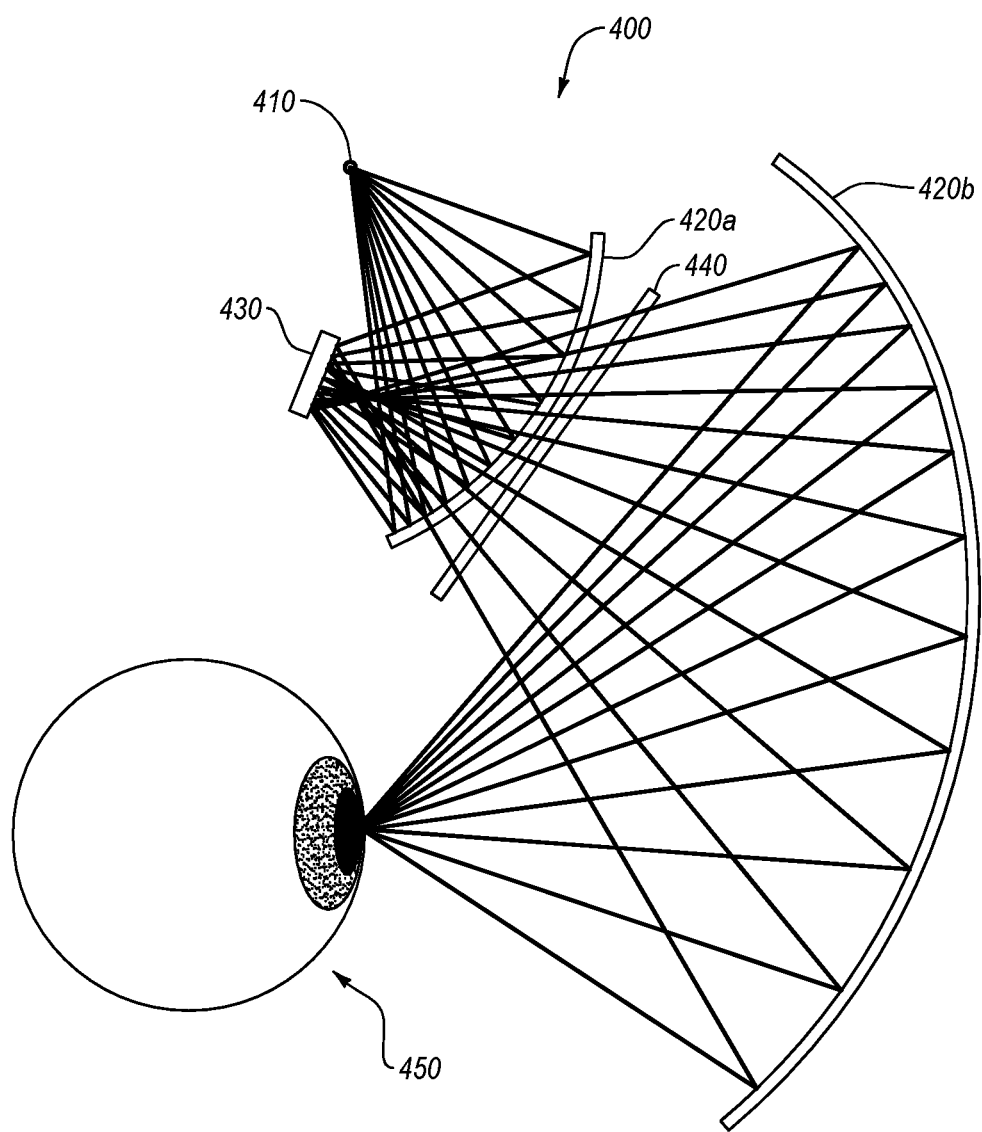
FIG. 4 illustrates a schematic view of a portion of another embodiment of a display system.

FIG. 4 illustrates a schematic view of a portion of another embodiment of a display system 400. The display system 400 comprises a light source 410, various lenses and/or mirrors 420a/420b, a spatial light modulator 430 ("SLM"), a switchable transmission hologram 440, and a representation of a user's eye 450. In at least one embodiment, the SLM 430 comprises phase SLM such as a liquid crystal on silicon display ("LCoS display") that is configured to modulate the phase of the light that reflects from its surface. In at least one embodiment, the depicted display system 400 comprises only a portion of a complete display system. For example, a complete display system may comprise separate display systems for each eye. Additionally, a complete display system may comprise separate spatial light modulators for each primary color.

In at least one embodiment, the switchable transmission hologram 440 comprises multiplexed, stacked switchable Bragg gratings. The switchable transmission hologram 440 comprises a multiplexed grating that shifts the angles from a phase SLM 430 into n multiple paths. Each grating is associated with a specific prescription, and each prescription forms a new pupil center location which is displaced from other pupil center locations so that the eye can only see one of the exit pupils at a time. As with tiling the field of view with switchable gratings, several switchable gratings are sandwiched into a stack. As will be explained more fully herein, one grating at a time is switched on using eye tracking to determine the appropriate grating. There are therefore n locations where a particular grating can be turned on. The phase SLM 430 provides perturbation of a spherical wave front to form the exit pupil and generate the pixel information. A particular phase map will be associated with a particular prescription within the multiplexed grating. Accordingly, the rendering engine 232 generates each phase map to correspond with a particular prescription and exit pupil location.

The spatial light modulator 430 modulates light from the light source 410 as indicated by the hologram that was generated by the rendering engine 232. The modulated light from the spatial light modulator 430 is directed towards a switchable hologram, in this case the switchable transmission hologram 440. Each switchable transmission hologram 440 is associated with a particular emission pathway of the modulated image light which is received from the spatial light modulator 430. Additionally, each switchable transmission hologram 440 is also associated with one or more resulting exit pupil locations on a viewing surface 420b.

The depicted viewing surface 420b comprises an ellipsoid. In at least one embodiment, an ellipsoid provides ideal imaging for single point ray tracing. The ellipsoid visor can be used for off-axis illumination for a phase SLM. Additionally, the ellipsoid visor can also be used with a plane beam splitter in the form of a birdbath and also as part of a pseudo-waveguide such as a prism eyepiece folded several times (e.g., until it is 5 mm thick). Similar concepts are also applicable to embedded Fresnel surfaces.

In at least one additional or alternative embodiment, each switchable transmission hologram 440 is also associated with a unique prescription that is configured to remove aberrations from the modulated image light. For example, the switchable transmission hologram 440 may comprise a multiplexed, stack of switchable Bragg gratings. Each stacked switchable Bragg grating may be associated with a unique prescription that removes aberrations from the resulting three-dimensional image. Further, in at least one embodiment, the prescription also reduces the bandwidth needed by the hologram on the spatial light modulator 430, in addition to reducing aberrations. For example, the prescription may add base optical power.

During use, the processor(s) 230 control the switchable transmission hologram 440 by selectively activating different layers within the switchable transmission hologram 440. For example, when the eye tracker 250 detects a location of the user's gaze, the processor(s) 230 activate a particular layer within the switchable transmission hologram 440 that creates an exit pupil at the location of the user's gaze. In at least one embodiment, activating a particular layer within the switchable transmission hologram 440 comprises adding or removing a voltage from a switchable Bragg grating. Changing the voltage causes transmission gratings within the switchable Bragg grating to become visible and to diffract the modulated light in a particular direction. Accordingly, during use at least a portion of the switchable transmission hologram 440 remains deactivated.

Figure 5:
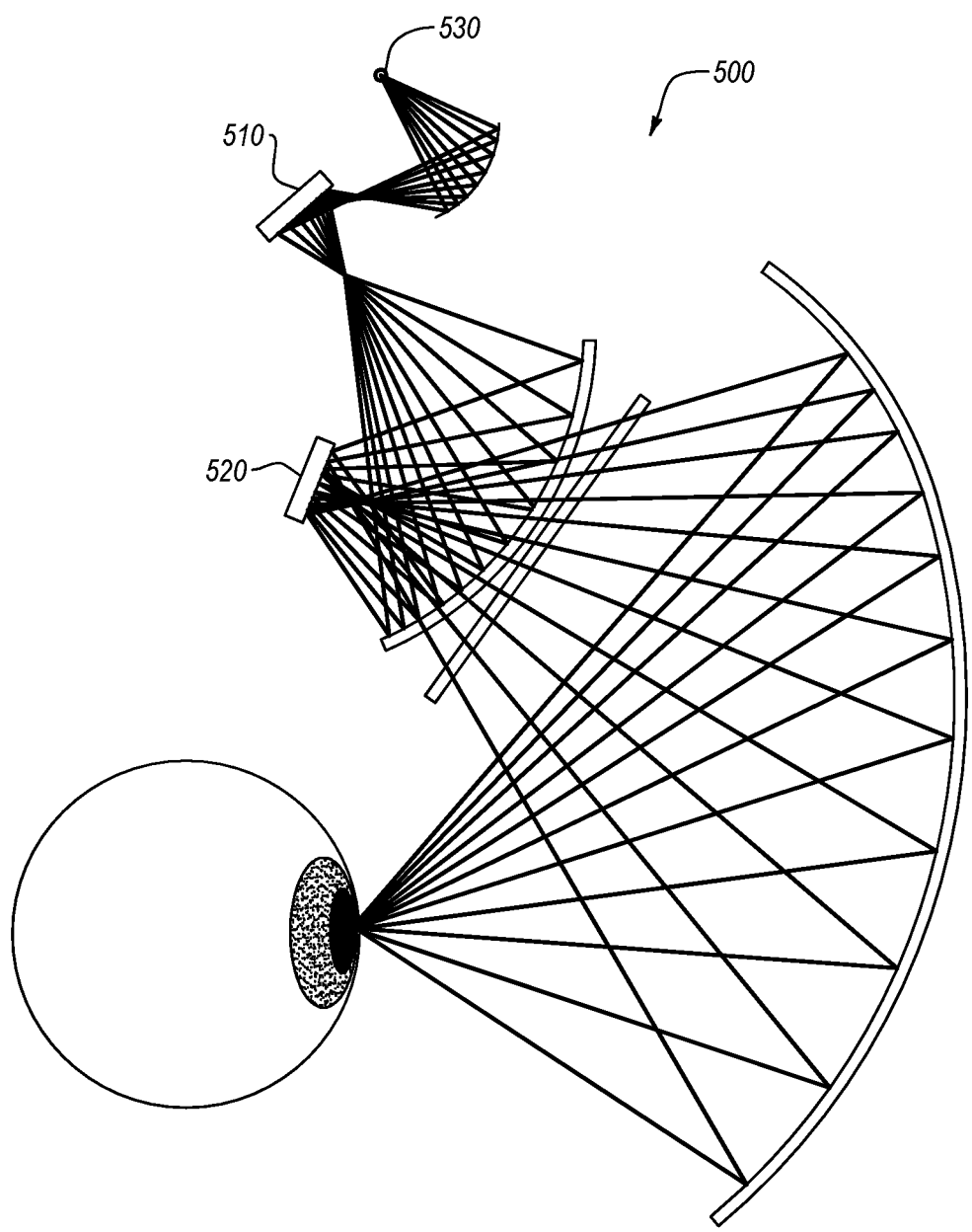
FIG. 5 illustrates a schematic view of a portion of yet another embodiment of a display system.

FIG. 5 illustrates a schematic view of a portion of another embodiment of a display system 500. This display system 500 is similar to the display system 400 of FIG. 400, except for the addition of an additional light modulator 510. The additional light modular 510 further modulates at least the amplitude of the light emitted by the light source 530. In at least one additional or alternative embodiment, the additional light modulator 510 comprises a microelectromechanical (MEMS) device configured to modulate the amplitude of the light emitted from the light source. For example, the MEMS cover a set of pixels that interact to form a far field light pattern. In an additional or alternative embodiment, a lower resolution amplitude spatial light modulator, such as an LCoS or transmissive LCD, is used. In contrast, in at least one embodiment, the MEMS is configured to modulate the phase of the light impacting the spatial light modulator. Similarly, in at least one embodiment, the spatial light modulator is configured to modulate the amplitude of the light.

In at least one embodiment, utilizing the additional light modulator 510 simplifies the calculations that are required to generate specific colors, such as black and white, on the viewing surface 420*b*. For example, creating a black or a white color using only the spatial light modulator 520 may require complex calculations to cancel out the modulated light at a specific pixel. The additional light modulator 510, in contrast, can simplify the math by allowing an amplitude component of the modulated light to be adjusted. Additionally, including the additional light modulator 510 may also improve image quality by increasing contrast and reducing noise within the image.

In at least one embodiment, the additional light modulator 510 (e.g., a microelectromechanical device) is positioned between the light source 530 and the spatial light modulator 520. In an additional or alternative embodiment, the additional light modulator 510 and the spatial light modulator 520 are included within a single device that both modulates the phase and the amplitude of the light emitted by the light source 530.

Figure 6:
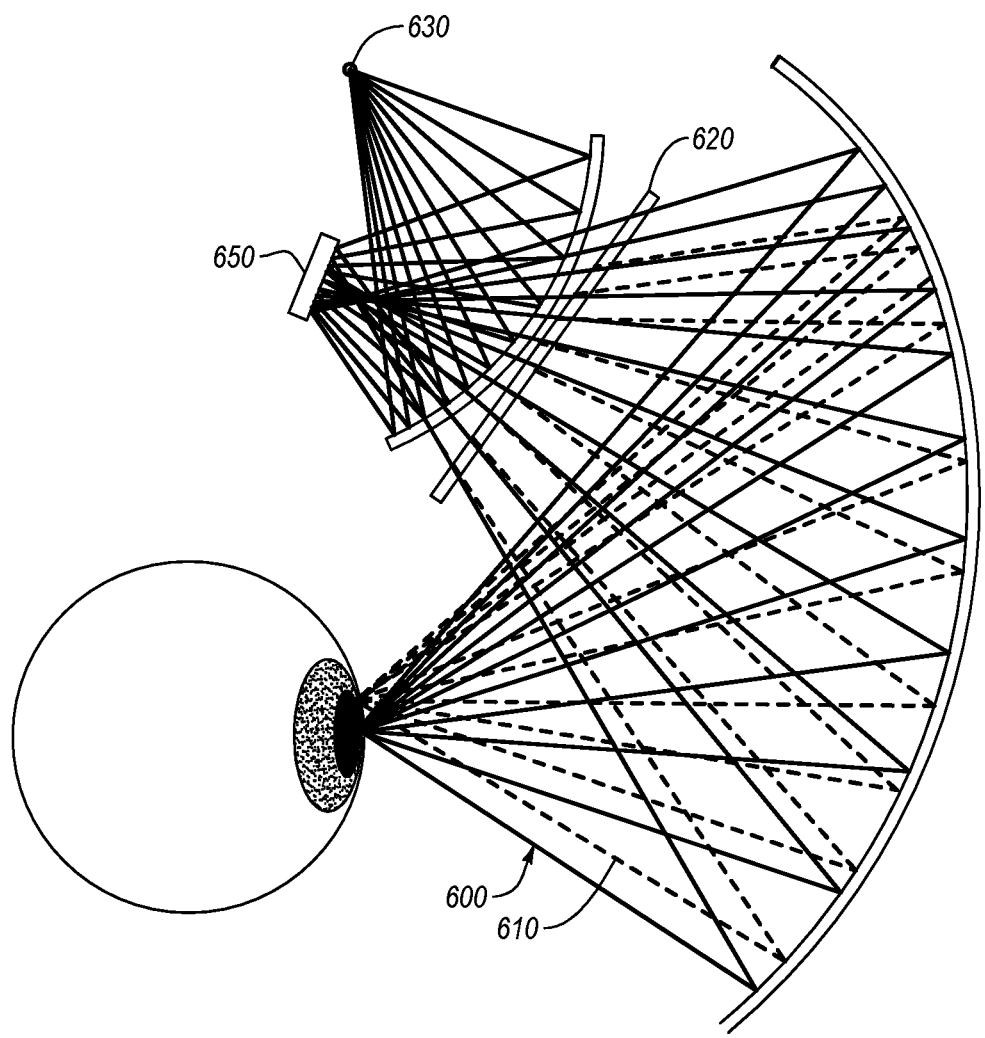
FIG. 6 illustrates another schematic view of a portion of the embodiment of the display system depicted in FIG. 4.

FIG. 6 illustrates another schematic view of a portion of the embodiment of the display system depicted in FIG. 4. In particular, FIG. 6 depicts two different pathways 600, 610 that the modulated light takes through the spatial light modulator 630. While both pathways 600, 610 are shown concurrently, in at least one embodiment, only a single pathway is active at a time. Each pathway 600, 610 is associated with one or more specific layers in the switchable transmission hologram 620.

In at least one embodiment, the rendering engine 232 generates a specific hologram based upon the particular active layer within the multiplexed, switchable transmission hologram 620 and associated pathway 600, 610. As explained above, the specific hologram is generated in the form of specific rendering information, such as a phase map. The spatial light modulator 630 modulates the light received from the light source 630 as indicated by the specific hologram. The specific hologram is associated with image data displayed at the exit pupils associated with the specific pathway 600, 610. As such, the rendering engine 232 generates a hologram, at least in part, based upon the location at which the three-dimensional image will be rendered on the viewing surface 420*b*. While only two viewing paths 600, 610 are depicted in FIG. 6, one will understand that any number of viewing paths and associated exit pupil locations can be created using additional layers within the multiplexed, switchable transmission hologram 620.

Figure 7:
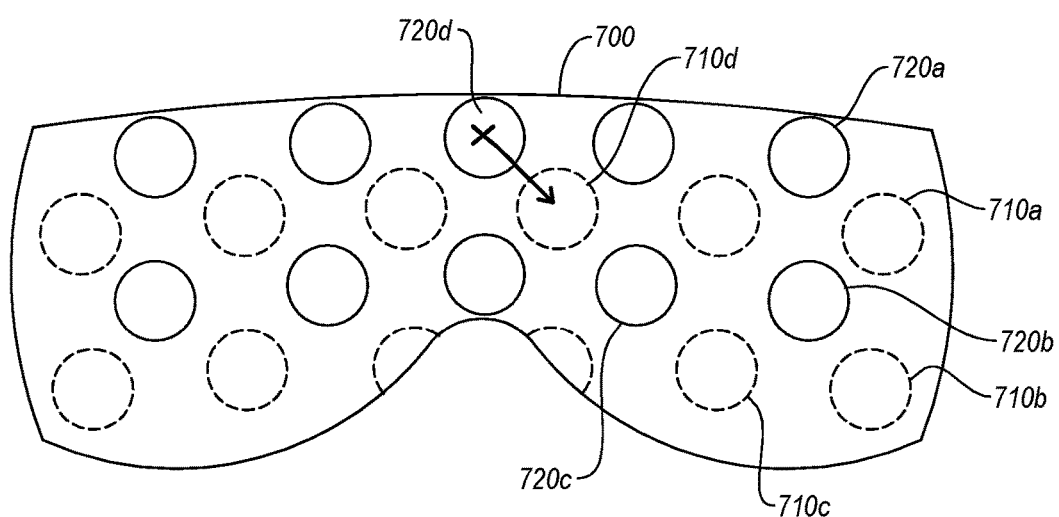
FIG. 7 illustrates a schematic view of multiple exit pupils depicted on an embodiment of a viewing surface.

FIG. 7 illustrates a schematic view of multiple exit pupils 710(*a-d*), 720(*a-d*) depicted on an embodiment of a viewing surface 700. While only two distinct sets of exit pupil locations are depicted (distinguished by a dashed line versus a solid line), in various embodiments, any number of sets of exit pupil locations can be generated. In at least one embodiment, each set of exit pupil locations comprises multiple pupil exit locations that are simultaneously displayed on the viewing surface and that are separated by more than a pupil radius from each other. Additionally, while only a portion of the exit pupils are labelled 710*a*-710*d*, 720*a*-720*d*, one will understand that multiple additional exit pupil locations are depicted on the viewing surface 700.

In at least one embodiment, the eye tracker 260 tracks the gaze direction of a user's eye and maps it to a particular location of the viewing surface 700. For example, a user may currently be gazing at exit pupil 720*d*. The eye tracker 260 detects that the user's gaze is shifting away from the location of exit pupil 720*d* and towards exit pupil location 710*d*. In response to the detected movement, the processor(s) 230 activates a second switchable grating within the switchable hologram 620 that is associated with an exit pupil location 720*d* that aligns with the second viewing location. In activating the second switchable grating within the switchable hologram 620, the processor(s) 230 also deactivated the switchable grating within the switchable hologram 620 that is associated with exit pupil location 720*d*. Accordingly, in at least one embodiment, a user is presented with a constant field of view as the user's eyes track across the viewing surface 700 from a first exit pupil location 720*d* to a second exit pupil location 710*d*.

As such, in at least one disclosed embodiment, each exit pupil location shows a correct image that is specific to the exit pupil location. Additionally, each exit pupil depicts a virtual, three-dimensional object with a correct depth of field. Both the depth of field and the image content are determined by the rendering engine based upon the exit pupil location, and the switchable grating through which the modulated light will be traveling.

Figure 8:
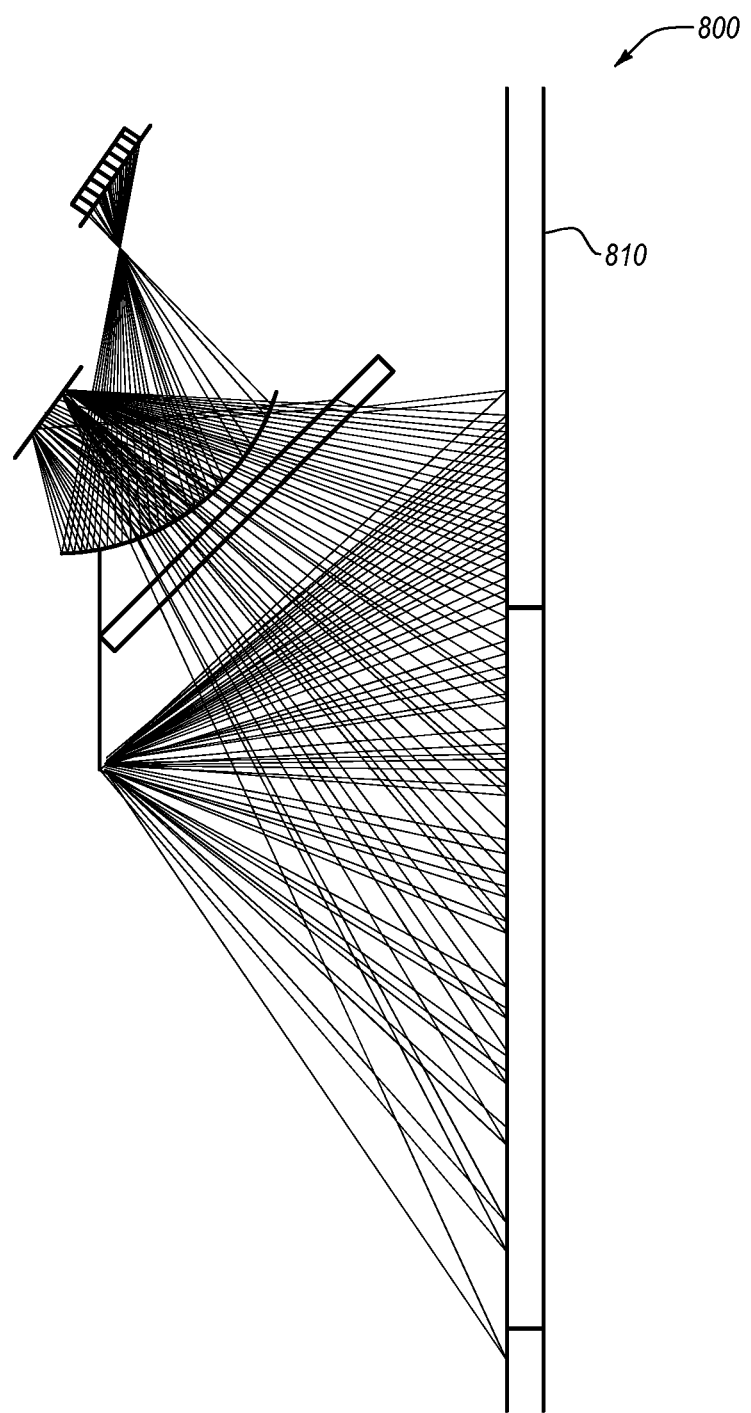
FIG. 8 illustrates a schematic view of a portion of another embodiment of a display system.

In various embodiments, multiple different viewing surface shapes and structures can be utilized. For example, FIG. 8 illustrates a schematic view of a portion of another embodiment of a display system 800. The depicted display system 800 comprises a viewing surface that includes a flat Fresnel lens 810. Additional or alternative embodiments of viewing surfaces utilize curved smooth surfaces, curved Fresnel lens, static reflection holograms, and other alternative viewing surfaces.

One will appreciate that embodiments disclosed herein can also be described in terms of flowcharts comprising one or more acts for accomplishing a particular result. For example, FIG. 9 and the corresponding text describe acts in various systems for performing methods and/or stand-alone methods for rendering an image within a computer system. The acts of FIG. 9 are described below.

Figure 9:
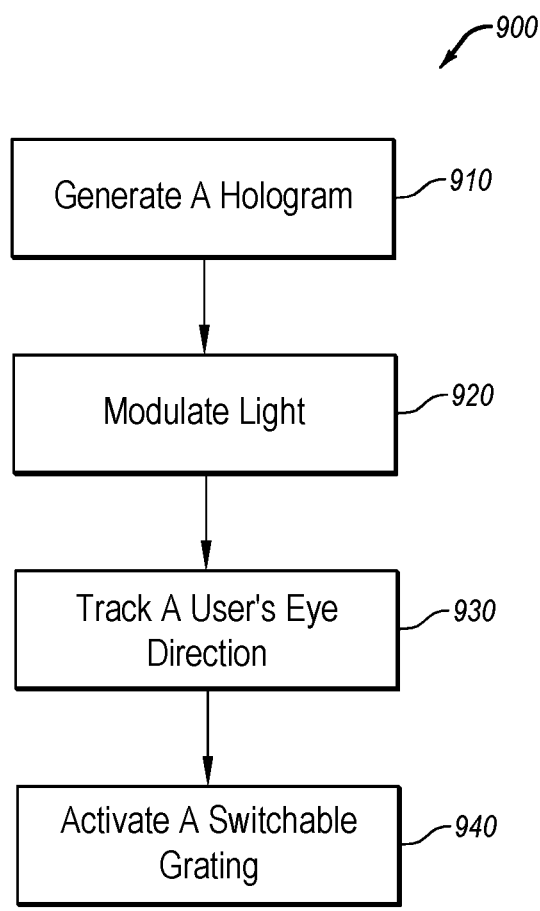
FIG. 9 illustrates a flowchart for an embodiment of a method for rendering an image within a computer system.

For example, FIG. 9 illustrates a flowchart 900 of acts associated with methods for rendering an image within a computer system. The illustrated acts comprise an act 910 of generating a hologram. Act 910 includes generating a first hologram representative of a three-dimensional object. The first hologram includes depth information that causes the three-dimensional object to be rendered with a focus that is determined by the depth information. For example, as depicted in FIGS. 1, 2 and 4 and the accompanying description, a rendering engine 232 generates a hologram representative of a vase 120. In at least one embodiment, the hologram comprises a phase map that represents the vase 120 with a proper focus based upon the location of the vase with a depth of focus with respect to the user 100.

Additionally, FIG. 9 illustrates an act 920 of modulating light. Act 920 includes modulating light with a spatial light modulator as indicated by the first hologram. For example, as depicted in FIGS. 2 and 4 and the accompanying description, a phase spatial light modulator 430, such as an LCoS display, modulates the light as indicated by a hologram in the form of a phase map received from the rendering engine 232.

FIG. 9 also illustrates an act 930 of tracking a user's eye direction. Act 930 includes tracking, with an eye tracker, a viewing direction of a user's eye to a first viewing location on a viewing surface. For example, as depicted in FIGS. 2, 6, and 7 and the accompanying description, the eye tracker 250 tracks the user's gaze to a location of the viewing surface 700. One or more of the eye tracker 250 and the processor(s) 230 identify a particular exit pupil location 710(*a-d*), 720(*a-d*) that the user's gaze is directed towards.

Further, FIG. 9 illustrates an act 940 of activating a switchable grating. Act 940 includes activating a first switchable grating within a switchable hologram that is associated with an exit pupil location that aligns with the first viewing location. For example, as depicted in FIGS. 2, 6, and 7 and the accompanying description, the processor(s) 230 activate a specific layer within the switchable transmission hologram 620 that is associated with an exit pupil location that aligns with the first location. In at least one embodiment, the processor(s) 230 activate the specific layer by removing a voltage from the specific layer within the switchable transmission hologram 620. Removing the voltage causes the specific layer to activate and diffract the modulated light along a particular path 600, 610 which aligns with the target exit pupil location.

Accordingly, disclosed embodiments comprise methods, systems, and apparatus for rendering three-dimensional images within a computer system. In particular, disclosed embodiments provide a compact form factor that utilizes fewer bulky lenses than some conventional systems. Additionally, disclosed embodiments provide for adaptive focus based upon the location of the rendered object. Disclosed embodiments also provide a wide field of views while maintaining the angular resolution of the display.

The disclosed methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A head-mounted display device comprising:
   a rendering engine configured to generate a hologram representative of a three-dimensional object, wherein the hologram includes depth information that causes the three-dimensional object to be rendered with a focus that is determined by the depth information;
   a spatial light modulator that modulates light from a light source as indicated by the hologram;
   a switchable transmission hologram comprising multiple stacked switchable gratings, wherein each of the stacked switchable gratings is associated with:
   a particular emission pathway of the modulated image light which is received from the spatial light modulator;
   one or more resulting exit pupil locations on a viewing surface; and
   a first prescription that is configured to remove aberrations from the modulated image light;
   an eye tracker configured to map a viewing direction of a user's eye to a viewing location on the viewing surface; and
   a processor configured to activate a particular switchable grating within the switchable transmission hologram that is associated with an exit pupil location that aligns with the viewing location.

2. The head-mounted display device as recited in claim 1, wherein at least a portion of the stacked switchable gratings remain deactivated.

3. The head-mounted display device as recited in claim 1, further comprising a microelectromechanical device configured to modulate the amplitude of the light emitted from the light source.

4. The head-mounted display device as recited in claim 3, wherein the microelectromechanical device is positioned between the light source and the spatial light modulator.

5. The head-mounted display device as recited in claim 1, wherein the spatial light modulator modulates the phase of the light.

6. The head-mounted display device as recited in claim 1, wherein the spatial light modulator comprises a liquid crystal on silicon display.

7. The head-mounted display device as recited in claim 1, wherein the first prescription is also configured to add base power to the modulated light.

8. The head-mounted display device as recited in claim 1, wherein the spatial light modulator is associated with a second prescription that is configured to remove aberrations from the modulated image light.

9. The head-mounted display device as recited in claim 1, wherein the viewing surface comprises a flat Fresnel lens.

10. A method for rendering an image within a computer system, the method comprising:
    generating a first hologram representative of a three-dimensional object, wherein the first hologram includes depth information including per-pixel focus information based at least in part on a first viewing location of a user's eye on a viewing surface that causes the three-dimensional object to be rendered with a focus that is determined by the depth information;
    modulating light with a spatial light modulator as indicated by the first hologram;
    tracking, with an eye tracker, a viewing direction of a user's eye to the first viewing location on the viewing surface; and
    activating a first switchable grating within a switchable hologram that is associated with a first exit pupil location that aligns with the first viewing location.

11. The method as recited in claim 10, wherein each of the stacked switchable gratings within the switchable hologram is associated with:
    a different emission pathway of the modulated light received from the spatial light modulator,
    one or more different resulting exit pupil locations on a viewing surface; and
    a different prescription that is configured to remove aberrations from the modulated light.

12. The method as recited in claim 10, wherein the first switchable grating is associated with exit pupil locations that are simultaneously displayed on the viewing surface and that are separated by more than a pupil radius from each other.

13. The method as recited in claim 10, further comprising:
    detecting, with the eye tracker, that the user's eye is changing directions to a second viewing location that is different than the first viewing location.

14. The method as recited in claim 13, further comprising:
    modulating light with the spatial light modulator as indicated by a second hologram, wherein the second hologram is associated with image data displayed at the second viewing location.

15. The method as recited in claim 13, further comprising:
    activating a second switchable grating within the switchable hologram that is associated with a second exit pupil location that aligns with the second viewing location.

16. The method as recited in claim 15, wherein activating the second switchable grating comprises changing a voltage to the first switchable grating and changing a voltage from the second switchable grating.

17. The method as recited in claim 10, further comprising modulating an amplitude of the light impacting the spatial light modulator with a microelectromechanical device.

18. The method as recited in claim 10, wherein the spatial light modulator modulates the phase of the light.

19. The method as recited in claim 10, wherein the spatial light modulator comprises a liquid crystal on silicon display.

20. A computer display system for generating three-dimensional viewing comprising:
    a liquid crystal on silicon display configured to modulate the light as indicated by a phase map;

a multiplexed switchable Bragg grating comprising multiple switchable Bragg gratings, wherein each of the switchable Bragg gratings is associated with:
   a unique emission pathway of the modulated image light received from the liquid crystal on silicon display,
   multiple, unique resulting exit pupil locations on a viewing surface; and
   a unique prescription that is configured to remove aberrations from the modulated image light;
an eye tracker configured to map a viewing direction of a user's eye to a viewing location on the viewing surface; and
a processor configured to activate a particular switchable Bragg grating within the multiplexed switchable Bragg grating that is associated with an exit pupil location that aligns with the viewing location.

\* \* \* \* \*